US006788867B2

(12) United States Patent
Mule' et al.

(10) Patent No.: US 6,788,867 B2
(45) Date of Patent: Sep. 7, 2004

(54) BACKPLANE, PRINTED WIRING BOARD, AND/OR MULTI-CHIP MODULE-LEVEL OPTICAL INTERCONNECT LAYER HAVING EMBEDDED AIR-GAP TECHNOLOGIES AND METHODS OF FABRICATION

(75) Inventors: Tony Mule', Atlanta, GA (US); James D. Meindl, Marietta, GA (US); Paul Kohl, Atlanta, GA (US); Stephen M. Schultz, Tucson, AZ (US); Thomas K. Gaylord, Atlanta, GA (US); Elias N. Glytsis, Dunwoody, GA (US); Ricardo Villalaz, Atlanta, GA (US); Muhannad Bakir, Atlanta, GA (US); Hollie Reed, Smyrna, GA (US)

(73) Assignee: Georgia Tech Research Corp., Atlanta, GA (US)

( * ) Notice: Subject to any disclaimer, the term of this patent is extended or adjusted under 35 U.S.C. 154(b) by 0 days.

(21) Appl. No.: 10/734,075

(22) Filed: Dec. 11, 2003

(65) Prior Publication Data

US 2004/0126076 A1 Jul. 1, 2004

Related U.S. Application Data

(63) Continuation of application No. 10/135,314, filed on Apr. 29, 2002, now abandoned.
(60) Provisional application No. 60/287,440, filed on Apr. 30, 2001.

(51) Int. Cl.[7] ................................................. G02B 6/00
(52) U.S. Cl. ..................... 385/129; 385/14; 385/130; 385/132
(58) Field of Search ........................... 385/14, 123–132; 65/403; 257/186

(56) References Cited

U.S. PATENT DOCUMENTS 4,732,446 A    3/1988   Gipson et al. ............ 350/96.15
4,943,136 A    7/1990   Popoff ...................... 350/96.16
5,037,173 A    8/1991   Sampsell et al. ............. 385/17
5,039,189 A    8/1991   Lytel et al. ..................... 385/2
5,073,000 A   12/1991   Derfiny ....................... 385/14
5,101,460 A    3/1992   Richard ....................... 385/37
5,159,700 A   10/1992   Reid, deceased et al. ..... 385/14
5,224,184 A    6/1993   Boudreau .................... 385/35

(List continued on next page.)

OTHER PUBLICATIONS

Chen, et al.; Fully Embedded Board–Level Guided–Wave Optoelectronic Interconnects; Jun., 2000; Proceedings of the IEEE, vol. 88, No. 6; pp 780–793.

Wiesmann, et al.; Singlemode Polymer Wavguides For Optical Backplanes; Dec. 5, 1996; Electronics Letters, vol. 32, No. 25; pp 2329–2330.

Barry, et al.; Highly Efficient Coupling Between Single–Mode Fiber and Polymer Optical Waveguides; Aug., 1997; IEEE Transactions on Components, Packaging, and Manufacturing Technology—Part B, vol. 20, No. 3; pp 225–228.

Lee, et al.; Fabrication of Polymeric Large–Core Waveguides for Optical Interconnects Using a Rubber Molding Process; Jan., 2000; IEEE Photonics Technology Letters, vol. 12, No. 1; pp 62–64.

(List continued on next page.)

Primary Examiner—Phan T. H. Palmer
(74) Attorney, Agent, or Firm—Thomas, Kayden, Horstemeyer & Risley, LLP

(57) ABSTRACT

Optical interconnect layers and methods of fabrication thereof are described. In addition, the optical interconnect layers integrated into devices such as backplane (BP), printed wiring board (PWB), and multi-chip module (MCM) level devices are described. A representative optical interconnect layer includes a first cladding layer, a second cladding layer, one or more waveguides having a waveguide core and an air-gap cladding layer engaging a portion of waveguide core, wherein the first cladding layer and the second cladding layer engage the waveguide.

19 Claims, 10 Drawing Sheets

SECTION A-A

U.S. PATENT DOCUMENTS

| Patent No. | Date | Inventor | Class |
|---|---|---|---|
| 5,245,680 A | 9/1993 | Sauter | 385/24 |
| 5,263,111 A | 11/1993 | Nurse et al. | 385/130 |
| 5,276,762 A | 1/1994 | Hartman et al. | 385/137 |
| 5,296,950 A | 3/1994 | Lin et al. | 359/9 |
| 5,313,536 A | 5/1994 | Rossi et al. | 385/14 |
| 5,337,388 A | 8/1994 | Jacobowitz et al. | 385/76 |
| 5,371,820 A | 12/1994 | Welbourn et al. | 385/76 |
| 5,396,573 A | 3/1995 | Ecker et al. | 385/88 |
| 5,408,567 A | 4/1995 | Hamilton | 385/132 |
| 5,416,861 A | 5/1995 | Koh et al. | 385/14 |
| 5,418,360 A | 5/1995 | Sokolowska et al. | 250/227.12 |
| 5,432,630 A | 7/1995 | Lebby et al. | 359/152 |
| 5,442,475 A | 8/1995 | Bausman et al. | 359/140 |
| 5,450,508 A | 9/1995 | Decusatis et al. | 385/25 |
| 5,469,518 A | 11/1995 | Song et al. | 385/89 |
| 5,499,311 A | 3/1996 | DeCusatis | 385/89 |
| 5,521,992 A | 5/1996 | Chun et al. | 385/14 |
| 5,548,772 A | 8/1996 | Lin et al. | 395/800 |
| 5,568,574 A | 10/1996 | Tanguay, Jr. et al. | 385/14 |
| 5,611,014 A | 3/1997 | Basavanhally | 385/90 |
| 5,649,045 A | 7/1997 | Fjare et al. | 385/145 |
| 5,652,811 A | 7/1997 | Cook et al. | 385/14 |
| 5,659,641 A | 8/1997 | DeMeritt et al. | 385/14 |
| 5,757,989 A | 5/1998 | Yoshimura et al. | 385/14 |
| 5,761,350 A | 6/1998 | Koh | 385/14 |
| 5,774,614 A | 6/1998 | Gilliland et al. | 385/88 |
| 5,835,646 A | 11/1998 | Yoshimura et al. | 385/14 |
| 5,841,927 A | 11/1998 | Watanabe et al. | 385/129 |
| 5,842,881 A | 12/1998 | Ecker et al. | 439/329 |
| 5,854,868 A | 12/1998 | Yoshimura et al. | 385/50 |
| 5,864,642 A | 1/1999 | Chun et al. | 385/14 |
| 5,902,715 A | 5/1999 | Tsukamoto et al. | 430/290 |
| 5,923,451 A | 7/1999 | Karstensen et al. | 359/163 |
| 5,929,518 A | 7/1999 | Schlaiss | 257/712 |
| 6,049,639 A | 4/2000 | Paniccia et al. | 385/14 |
| 6,052,498 A | 4/2000 | Paniccia | 385/14 |
| 6,065,881 A | 5/2000 | Okada et al. | 385/88 |
| 6,071,017 A | 6/2000 | Gilliland et al. | 385/93 |
| 6,081,632 A | 6/2000 | Yoshimura et al. | 385/5 |
| RE36,820 E | 8/2000 | McGinley et al. | 361/752 |
| 6,141,072 A | 10/2000 | Drabik et al. | 349/122 |
| 6,162,838 A | 12/2000 | Kohl | 521/77 |
| 6,165,890 A | 12/2000 | Kohl et al. | 438/619 |
| 6,179,627 B1 | 1/2001 | Daly et al. | 439/76.1 |
| 6,185,648 B1 | 2/2001 | Munoz-Bustamante et al. | 710/126 |
| 6,215,585 B1 | 4/2001 | Yoshimura et al. | 359/344 |
| 6,226,429 B1 | 5/2001 | Hikita et al. | 385/50 |
| 6,253,015 B1 * | 6/2001 | Ukrainczyk | 385/130 |
| 6,285,813 B1 | 9/2001 | Schultz et al. | 385/37 |
| 6,332,050 B1 | 12/2001 | Feldman et al. | 385/24 |
| 6,343,171 B1 | 1/2002 | Yoshimura et al. | 385/50 |

OTHER PUBLICATIONS

Schmeider, et al.; Electro–Optical Printed Circuit Board (EOPCB); 2000 Electronic Components and Technology Conference; pp 749–753.

Mederer, et al.; 3Gb/s Data Transmission With GaAs VCSELs Over PCB Integrated Polymer Waveguides; Sep., 20001; IEEE Photonics Technology Letters, vol. 13, No. 9; pp 1032–1034.

Schröder, et al.; Polymer Optical Interconnects for PCB; 2001; Session 13; Photonic Polymers II; pp 337–343.

Glukh, et al.; High–performance Polymeric Materials for Waveguide Applications; Aug., 2000; SPIE—The International Society for Optical Engineering, Linear, Nonlinear and Power Limiting Organics, San Diego, vol. 4106; pp 1–11.

Liu, et al.; Plastic VCSEL Array Packaging and High Density Polymer Waveguides for Board and Backplane Optical Interconnect; 1998; Electronic Components and Technology Conference, pp 999–1005.

* cited by examiner

SECTION A-A

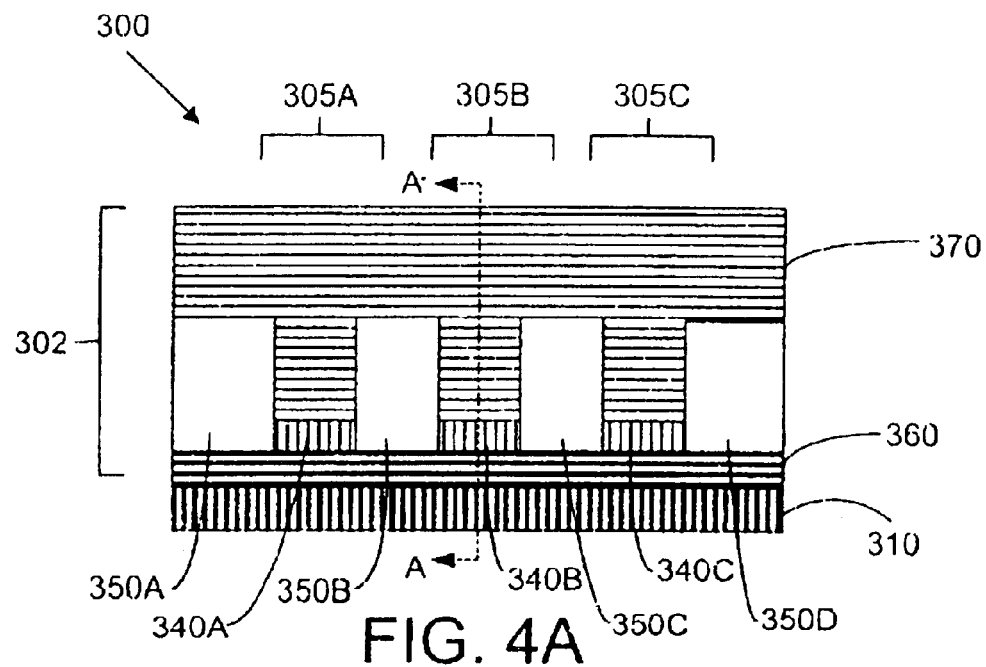
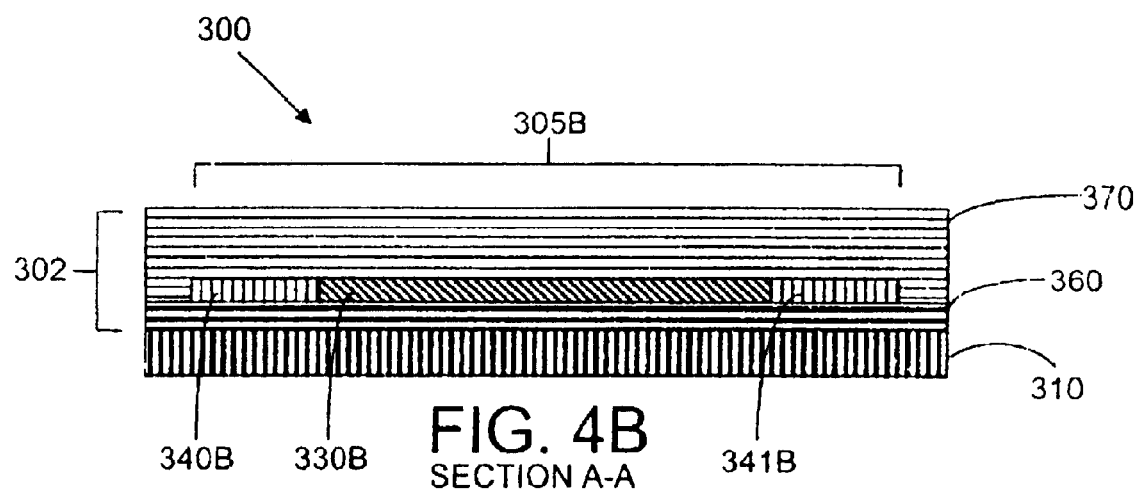

SECTION A-A

BACKPLANE, PRINTED WIRING BOARD, AND/OR MULTI-CHIP MODULE-LEVEL OPTICAL INTERCONNECT LAYER HAVING EMBEDDED AIR-GAP TECHNOLOGIES AND METHODS OF FABRICATION

CROSS-REFERENCE TO RELATED APPLICATION

This application claims priority to co-pending U.S. provisional application entitled, "Passive Thin-Film Integrated Optical Guided Wave Interconnection Layer Using Air-Gap And Volume Grating Coupler Technologies For Multi-Chip Module, Printed Wiring Board, And Backplane Applications And Method," having Ser. No. 60/287,440, filed Apr. 30, 2001, which is entirely incorporated herein by reference.

This application is a continuation of pending U.S. Utility Application entitled "Backplane, Printed Wiring Board, And/Or Multi-Chip Module-Level Optical Interconnect Layer Having Embedded Air-Gap Technologies And Methods Of Fabrication", having Ser. No. 10/135,314, filed Apr. 29, 2002 now abandoned.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of MDA 972-99-1-0002 awarded by the DARPA of the U.S. Government.

TECHNICAL FIELD

The present invention is generally related to backplane, printed wiring board, and multi-chip module devices and, more particularly, embodiments of the present invention are related to such devices having an optical interconnect layer or layers and methods of fabrication thereof.

BACKGROUND OF THE INVENTION

In general, waveguides are transmission paths adapted to direct the propagation of electromagnetic waves (e.g., light) in a longitudinal direction, while confining those electromagnetic waves within a certain cross-section. A waveguide is defined, in its simplest form, as a set of two or more materials consisting of a region of high refractive index (referred to hereafter as the core region) surrounded by a region or regions of lower refractive index (referred to hereafter as the cladding region(s)).

Integration of guided-wave optical interconnection at the backplane (BP), printed wiring board (PWB), or multi-chip module (MCM) level of system integration has been achieved through a variety of fabrication techniques, including injection molding (Wiesmann, R., et al., *Electron. Lett.*, 32, 2329; Lee, B., et al., *IEEE Photon. Technol. Lett.*, 12, 62), hot embossing (Schroder, H., et al., *IEEE Conference on Polymers and Adhesives in Microelectronics and Photonics*, October 2001, 337; Mederer, F., et al. *IEEE Photon. Technol. Lett.*, 13, 1032), trench-fill and patterning (Schmieder, K., et al., *IEEE Electronic Components and Technology Conference*, May 2000, 749), photodefinition (Liu, Y. S., et al., *IEEE Electronic Components and Technology Conference*, May 1998, 999), and lamination (Liu, Y. S., et al.). Prior technologies, however, rely on the relative index difference available through process-compatible core and cladding materials, which for typical polymers is very small (index contrast <0.03) (Glukh, K., et al., *Proc. SPIE Linear, Nonlinear, and Power-limiting Organics*, August 2000, 43). As lithographic technology for the BP, PWB, or MCM level approaches the wavelengths of light common to optical interconnect technologies (~1 $\mu$m) (Jain, K., et al., *Printed Circuit Fabrication*, 24, 24), the importance of increasing the relative index difference between) core and cladding regions increases due to the desire for reduced waveguide-to-waveguide crosstalk and higher optical interconnect densities.

Many methods of coupling light into BP, PWB, and/or MCM-level waveguides have been investigated, including total internal reflection (TIR) mirrors (U.S. Pat. Nos. 6,343, 171, 6,332,050, and 5,263,111; Chen, R. T., et al., *Proc. IEEE*, 88, 780), surface-relief gratings (U.S. Pat. Nos. 6,215, 585, 5,761,350, 5,416,861, and 5,469,518), and plastic assemblies for butt-coupling of optical fibers to waveguides (U.S. Pat. No. 6,226,429 and Barry, T. S., et al., *IEEE Trans. Components, Packaging, and Manufacturing Technol-Pt. B*, 20, 225), for example.

The selection of waveguide core and cladding materials is limited to those materials where the refractive index of the waveguide cladding material exhibits a lower refractive index than the waveguide core material. Proper selection of materials can increase the relative index contrast between the waveguide core and the waveguide cladding. Two key advantages to a high index contrast waveguide technology include decreased bending loss along bent waveguide paths and reduced cross-talk between adjacent waveguides. Lower bending loss allows for more efficient optical power budgets, while reduced crosstalk enables higher interconnect density and reduced optical power splitter dimensions.

Thus, a heretofore unaddressed need exists in industries employing optical waveguide technology to address the aforementioned deficiencies.

SUMMARY OF THE INVENTION

Briefly described, the present invention provides for optical interconnect layers and methods of fabrication thereof. In addition, the optical interconnect layers can be integrated into devices, such as backplane (BP), printed wiring board (PWB), and multi-chip module (MCM) level devices. A representative optical interconnect layer includes a first cladding layer, a second cladding layer, at least one waveguide having a waveguide core and an air-gap cladding layer engaging a portion of the waveguide core, wherein the first cladding layer and the second cladding layer engage the waveguide.

The present invention also involves methods of fabricating optical interconnect layers. A representative method for fabricating an optical interconnect layer includes the following steps: disposing a least one waveguide core on a portion of a first cladding layer; disposing a sacrificial layer onto at least one portion of the first cladding layer and a portion of the waveguide core; disposing a second cladding layer onto the first cladding layer and the sacrificial layer; and removing the sacrificial layer to define an air-gap cladding layer within the first cladding layer and the second cladding layer and engaging a portion of the waveguide core.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, the reference numerals designate corresponding parts throughout the several views.

FIG. 1B is a cross-sectional view of FIG. 1A in the A—A direction, as shown by the arrows in FIG. 1A.

FIGS. 2A–2M are cross-sectional views of the fabrication process relative to the view illustrated in FIG. 1A, while

FIGS. 4A–4B are schematics that illustrate two cross-sectional views of another device. FIG. 4B is a cross-sectional view of FIG. 4A in the A—A direction, as shown by the arrows in FIG. 4A.

FIGS. 5A–5H are cross-sectional views of the fabrication process relative to the view illustrated in FIG. 4A, while

FIG. 7B is a cross-sectional view of FIG. 7A in the A—A direction, as shown by the arrows in FIG. 7A.

FIGS. 8A–8I are cross-sectional views of the fabrication process relative to the view illustrated in FIG. 7A, while

DETAILED DESCRIPTION

In general, optical interconnect layers of the present invention can be included in devices such as, but not limited to, backplane (BP), printed wiring board (PWB), and multi-chip module (MCM) level devices. The optical interconnect layer can be monolithically incorporated or hybridly attached to the BP, PWB, and MCM devices.

The optical interconnect layer can include one or more optical dielectric waveguides having air-gap cladding layers surrounding one or more waveguide cores. The presence of air-gap cladding layers allows for a maximization in relative index difference between the waveguide core and cladding layer regions, which in turn permits tighter bends and increased waveguide density.

Another feature of the optical interconnect layers of the present invention includes having one or more coupling elements disposed within and/or adjacent to the waveguide core in order to couple optical power both into and out of the waveguide core. In particular, the coupling elements can be volume grating output couplers that allow for high-efficiency coupling, smaller output beam sizes, and tolerance to variations in system-level placement and optical wavelength. Furthermore, by distributing clock and/or data signals using optical interconnect layers having volume grating output couplers and air-gap cladding regions, low-loss, high density integrated optical waveguides that allow for the avoidance of performance limitations inherent in global inter-chip electrical interconnection can be realized.

Now having described optical interconnect layers and devices incorporating optical interconnect layers in general, potential embodiments of the present invention will be described in connection with examples 1–3 hereafter. While embodiments of devices having optical interconnect layers are described in connection with examples 1–3 and the corresponding text and figures, there is no intent to limit embodiments of the devices incorporating optical interconnect layers to these descriptions. On the contrary, the intent is to cover all alternatives, modifications, and equivalents included within the spirit and scope of embodiments of the present invention.

EXAMPLE 1

Figure 1A:
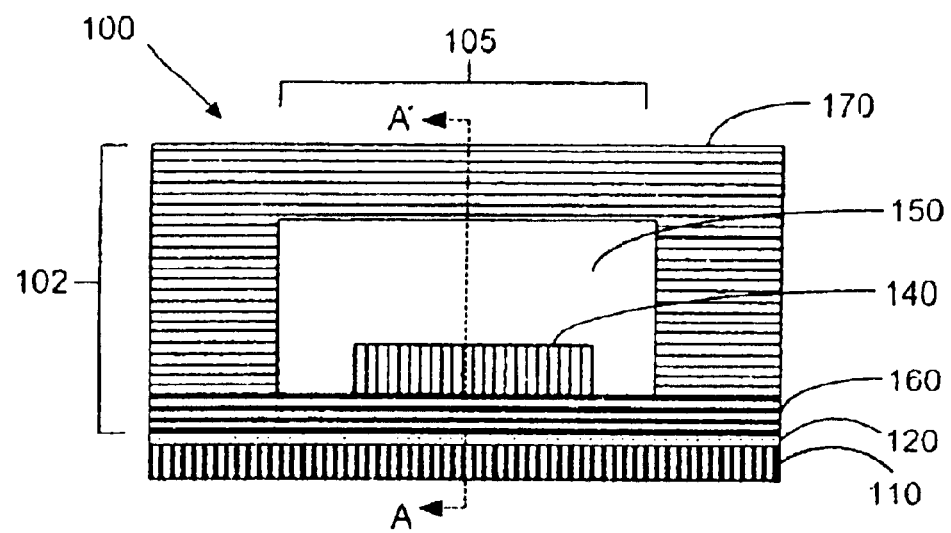
FIGS. 1A–1B are schematics that illustrate two cross-sectional views of a device.
Figure 1B:
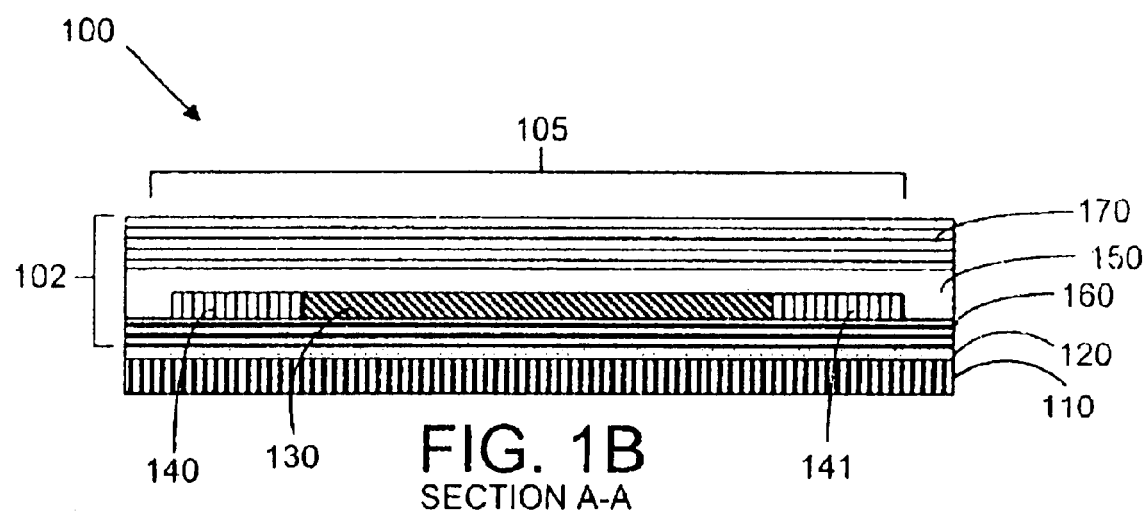

FIGS. 1A and 1B are schematics that illustrate two cross-sectional views of device 100 having an optical interconnect layer 102. FIG. 1B is a cross-sectional view of FIG. 1A in substantially the A—A direction, as shown by the arrows in FIG. 1A.

Device 100 includes an optical interconnect layer 102 attached to a substrate 110 via an adhesive layer 120. The optical interconnect layer 102 includes a waveguide 105, a first cladding layer 160, a second cladding layer 170, and the air-gap cladding layer 150. The waveguide 105 includes a waveguide core 130 and one or more coupler elements 140 and 141. The waveguide core 130 is disposed on the first cladding layer 160. The second cladding layer 170 is disposed around the air-gap cladding layer 150 and engages the First cladding layer 160. Additional details regarding the spatial relationship of the components of device 100, depicted in FIGS. 1A and 1B, are discussed in FIGS. 2A–2M and 3A–3M, which illustrate an exemplary hybrid fabrication process of device 100. It should be noted that other fabrication processes (e.g., monolithic fabrication process) could be used to fabricate device 100.

The substrate 110 can be any of a variety of substrates for BP, PWB, and MCM. The substrate 110 can include materials such as, for example, any dielectric material similar to, or the same as, those employed for the waveguide materials, polyimide, polyester, or metals such as gold (Au), copper (Cu), aluminum (Al), or nickel (Ni), or ceramics or organic materials found in printed wiring boards, such as FR-1, FR-2, FR-3, and FR-4, alumina, CEM-1, CEM-2, CEM-3, or PTFE, for example.

The waveguide 105 can be defined through multiple fabrication processes such as, but not limited to, photo-definition, wet chemical etching, thermally-induced refractive index gradients, and ion implantation. In addition, the waveguide 105 can have geometries such as, for example, a raised strip geometry, buried geometry, or rib geometry.

As indicated above, the waveguide 105 includes a waveguide core 130 and coupler elements 140 and 141 disposed at each end of the waveguide core 130. In this manner, energy (e.g., light) can enter one coupling element 140, travel down the waveguide core 130, and exit another coupling element 141.

The waveguide core 130 can be fabricated from materials such as, for example, polymer materials such as polynorbornene, polyimide, epoxy-based materials, or other polymers, or flexible, transparent dielectric materials. A reference describing polymer materials suitable for optical waveguide applications can be found in Blythe, A. R., et al., *Proc. 5$^{th}$ International Symposium on Polymers for Advanced Technologies.* August-December 2000, 601, for example.

In the case where coupling elements are included for optical power coupling, the type of coupling elements 140 and 141 that can be used include planar (or volume) grating couplers (as shown in FIGS. 1A–1B, 2A–2M, 3A–3M), evanescent couplers, surface-relief grating couplers, and total internal reflection couplers, for example. More specifically, when the couplers 140 and 141 are volume grating couplers, the coupling material can be laminated or spin-coated onto the appropriate surface. In particular, laminated volume grating couplers can be formed by holographic exposure of the grating region following lamination of the grating material. Alternatively, the laminated volume grating couplers can be formed by holographic exposure prior to lamination of the grating material. Additional details regarding grating couplers can be found in U.S. Pat. No. 6,285,813, which is herein incorporated by reference. The presence of coupling elements 140 and 141, however, are not a requirement for some embodiments of the present invention, as simple butt-coupling of optical power both into and out of waveguide core 130 can also be preformed.

The coupling material can be made of the same material as the waveguide core 130 or made of a different material. The coupling materials include, for example, polymer materials, silver halide photographic emulsions, photoresists such as dichromated gelatin, photopolymers such as polymethyl methacrylate (PMMA) or Dupont HRF™ photopolymer films, thermoplastic materials, photochromic materials such as crystals, glasses or organic substrates, photodichroic materials, and photorefractive crystals such as lithium niobate. The coupler materials have the characteristics of creating a refractive index modulation through a variety of mechanisms, all of which result in the creation of a phase or absorption or mixed grating. In particular, additional information regarding grating couplers can be found in Gaylord, T. K., et al., *Proc. IEEE,* 73, 894, which is incorporated herein by reference.

As depicted in FIGS. 1A–1B, the waveguide 105 includes an air-gap cladding layer 150 engaging (e.g., surrounding a portion of the waveguide) in a lateral fashion only or both laterally and above (as shown in FIGS. 1A and 1B) a portion of the waveguide core 130 and coupler elements 140 and 141. Typically, the air-gap cladding layer 150 extends the length of the waveguide core 130 and coupler elements 140 and 141. The air-gap cladding layer 150 has a lower index of refraction (e.g., index of refraction of 1) than the waveguide core 130.

The air-gap cladding layer 150 can be formed by the removal (e.g., decomposition) of a sacrificial layer (as shown in FIGS. 2A–2M and 3A–3M and depicted as sacrificial layer 220) from the area in which the air-gap cladding layer 150 is to be located, as illustrated in FIGS. 1A and 1B. The air-gap cladding layer 150 surrounds the first cladding layer 160, the waveguide core 130, and the coupler elements 140 and 141.

Generally, during the fabrication process of device 100, a sacrificial layer is deposited onto the first cladding layer 160, the waveguide core 130, and the coupler elements 140 and 141, and patterned. Thereafter, the second cladding layer 170 is deposited around the sacrificial layer and on the first cladding layer 160. Subsequently, the sacrificial layer is removed forming the air-gap cladding layer 150. The processes for depositing and removing the sacrificial layer are discussed in more detail hereinafter.

The sacrificial layer can be virtually any polymer that slowly decomposes to not create excessive pressure while forming the air-gap cladding layer 150 region. In addition, the decomposition of the sacrificial layer produces gas molecules small enough to permeate the second cladding layer 170. Further, the sacrificial layer has a decomposition temperature less than the decomposition or degradation temperature of the first and second cladding layers 160 and 170 and the waveguide core layer 130.

Examples of materials that can be used as the sacrificial layer include, but are not limited to, compounds such as polynorbornenes, polyoxymethylene, polycarbonates, polyethers, and polyesters. More specifically, the sacrificial layer may include compounds, such as BF Goodrich Unity™ 400, polypropylene carbonate, polyethylene carbonate, polyhexene carbonate, and polynorborene carbonate. The sacrificial layer may also contain photosensitive compounds, which are additives for patterning or decomposition. The addition off second component to the sacrificial polymer can deter its decomposition temperature. An acid will lower the decomposition temperature. Acids can be generated by irradiation of a photoacid generator, thus making the sacrificial polymer photosensitive.

The sacrificial layer can be deposited using techniques such as, for example, spin coating, doctor-blading, sputtering, lamination, screen or stencil-printing, chemical vapor deposition (CVD), and plasma based deposition systems.

The height of the air-gap cladding layer 150 can range from about 1 to about 100 micrometers, with the preferred height being about 10 to about 20 micrometers. In general, the height of the air-gap cladding layer 150 is controlled by both the weight fraction of the sacrificial polymer in solution as well as the deposition technique.

The sacrificial layer can be removed, for example, by thermal decomposition, ultraviolet irradiation, or through direct patterning during application (i.e., screen-printing or selective etching). The thermal decomposition of the sacrificial layer can be performed by heating the device 100 to the decomposition temperature of the sacrificial layer and holding at that temperature for a certain time period (e.g., 1–4 hours). Thereafter, the decomposition products diffuse through the second cladding layer 170 leaving a virtually residue-free hollow structure (air-gap cladding layer 150 region).

The first and second cladding layers 160 and 170 can be any material that has a lower index of refraction than the waveguide core 130, and these may include, for example, the same or similar materials as those employed for the waveguide core region 130. In addition, the first and second cladding layers 160 and 170 can be any modular polymer that includes the characteristic of being permeable or semipermeable to the decomposition gases produced by the decomposition of the sacrificial layer while forming the air-gap cladding layer 150. In addition, the first and second cladding layers 160 and 170 have elastic properties so as to not rupture or collapse under fabrication and use conditions. Further, the first and second cladding layers 160 and 170 are stable in the temperature range in which the sacrificial layer decomposes.

Examples of the first and second cladding layers 160 and 170 include compounds such as, for example, polyimides, polynorborenes, epoxides, polyarylenes, ethers, and parylenes. More specifically, in preferred embodiments, the overcoat layer 150 is a compound such as Amoco Ultradel™ 7501, BF Goodrich Avatrel™ Dielectric Polymer, DuPont™ 2611, DuPont™ 2734, DuPont™ 2771, or DuPont™ 2555.

The first and second cladding layers 160 and 170 can be deposited using any suitable technique such as, for example, spin coating, doctor-blading, sputtering, lamination, screen or stencil-printing, chemical vapor deposition (CVD), or through plasma based deposition systems.

Although only one waveguide core 130 is depicted in FIGS. 1A and 1B, one or more waveguide cores can be included in device 100. In addition, one or more waveguide cores/couplers can be included in the air-gap cladding layer 150. Further, multiple levels of waveguides and or waveguide cores can be built atop one another.

For the purposes of illustration only, and without limitation, device 100 of the present invention is described with particular reference to the below-described fabrication method. For clarity, some portions of the fabrication process are not included in FIGS. 2A–2M and 3A–3M. For example, photolithography or similar techniques can be used to define the first and second cladding layers 160 and 170, the sacrificial layer, and/or the waveguide core 130 pattern. In this regard, the pattern can be defined by depositing material using techniques such as, for example, sputtering, chemical vapor deposition (CVD), plasma based deposition systems, evaporation, and electron-beam systems. Furthermore, the pattern can then be removed using reactive ion etching techniques (RIE), for example.

The following fabrication process is not intended to be an exhaustive list that includes all steps required for fabricating device 100. In addition, the fabrication process is flexible because the process steps may be performed in a different order than the order illustrated in FIGS. 2A–2M and 3A–3M.

FIGS. 2A–2M are cross-sectional views of the fabrication process relative to the view illustrated in FIG. 1A, while FIGS. 3A–3M are cross-sectional views of the fabrication process relative to the view in FIG. 1B, section A—A of FIG. 1A. Therefore, FIGS. 2A–2M and 3A–3M illustrate corresponding views in the fabrication process from different cross-sectional views. The varying views of the fabrication process shown in FIGS. 2A–2M and 3A–3M have been provided to illustrate aspects of the fabrication process that are not necessarily observable using only FIGS. 2A–2M or FIGS. 3A–3M. In this regard, FIGS. 2A and 3A, 2B and 3B, 2C and 3C, and so on, are discussed in tandem to illustrate various aspects of the representative fabrication process.

Figure 2A:
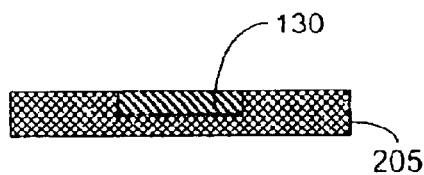
Figure 3A:
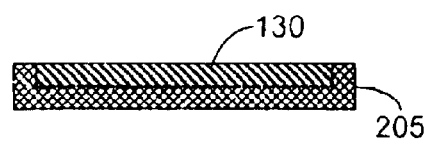
FIGS. 3A–3M are cross-sectional views of the fabrication process relative to the view in FIG. 1B, section A—A of FIG. 1A.
Figure 2B:
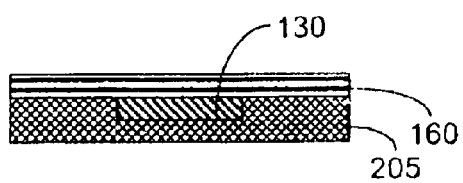
Figure 3B:
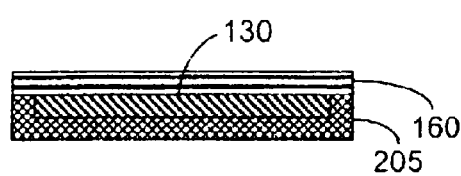

FIGS. 2A and 3A illustrate the waveguide core 130 disposed in the die substrate 205. The die substrate 205 is a template, mold, or preform that can be made of materials such as fused-silica or glass, for example. FIGS. 2B and 3B illustrate the first cladding layer 160 disposed on the die substrate 205 and the waveguide core 130.

Figure 2C:
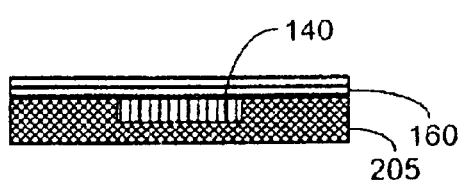
Figure 3C:
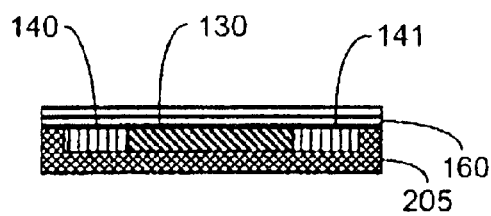

FIGS. 2C and 3C illustrate the defining of a portion of the waveguide core 130 into coupler elements 140 and 141. In an alternate embodiment, the waveguide core 130 and coupling material are different materials, in which case a portion of the waveguide material is removed and grating material is disposed in those areas. Thereafter, the grating couplers can be defined only within the areas containing the grating material.

Figure 2D:
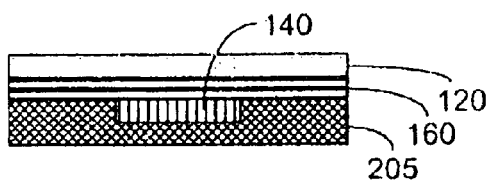
Figure 3D:
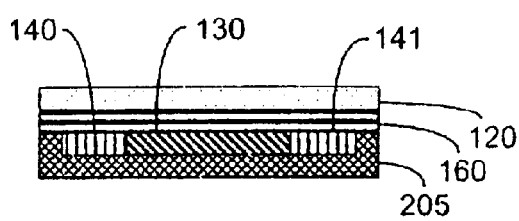

FIGS. 2D and 3D illustrate the application of an adhesive layer 120 disposed on the first cladding layer 160. The adhesive layer 120 can include adhesive tape, bonding tape, or other materials capable of attaching to the first cladding layer 160.

Figure 2E:
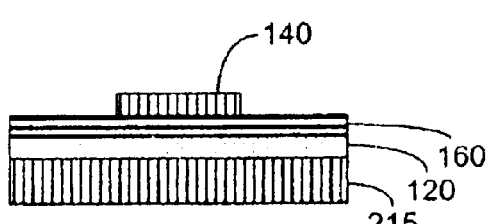
Figure 3E:
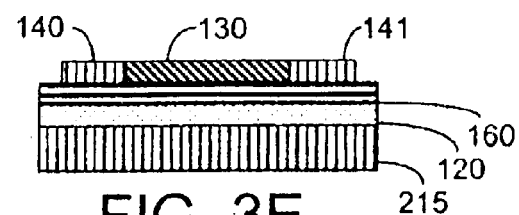

FIGS. 2E and 3E illustrate the removal of the die substrate 205, while the remaining portion is turned over and attached to a processing substrate 215. The processing substrate 215 is an optically flat surface such as a fused silica substrate, for example.

Figure 2F:
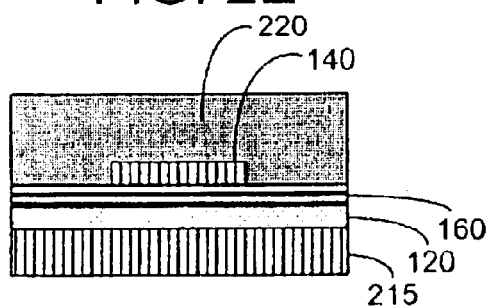
Figure 3F:
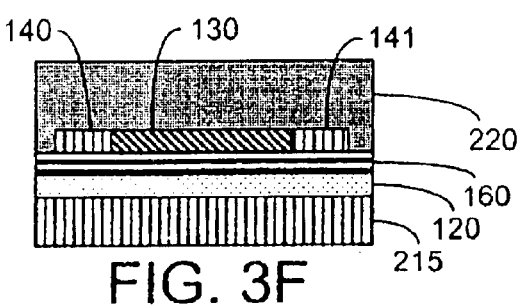

FIGS. 2F and 3F illustrate the sacrificial layer 220 disposed over the first cladding layer 160, the waveguide core 130, and the coupler elements 140 and 141. The sacrificial layer sections define the areas where the air-gap cladding layers will subsequently be located once the sacrificial layer sections are removed.

Figure 2G:
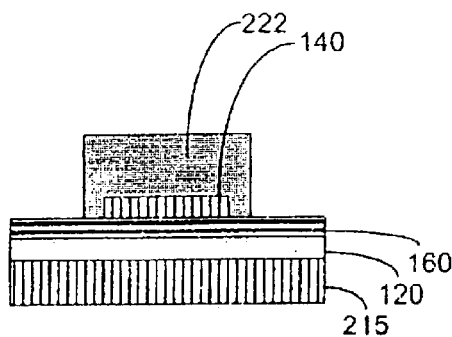
Figure 3G:
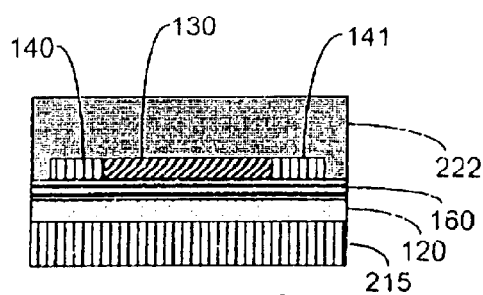

FIGS. 2G and 3G illustrate the formation of sacrificial layer section 222 by etching or ultra violet (UV) exposure/thermal decomposition, for example, of the sacrificial layer 220. The sacrificial layer section 222 defines the area where the air-gap cladding layer 150 will subsequently be located once the sacrificial layer section 222 is removed.

Figure 2H:
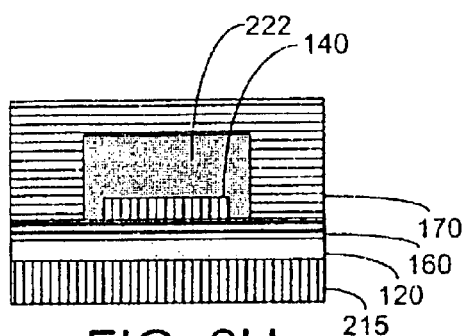
Figure 3H:
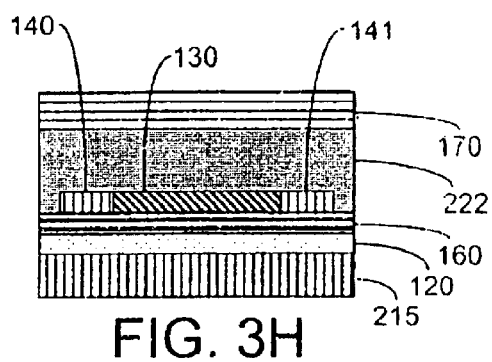
Figure 2I:
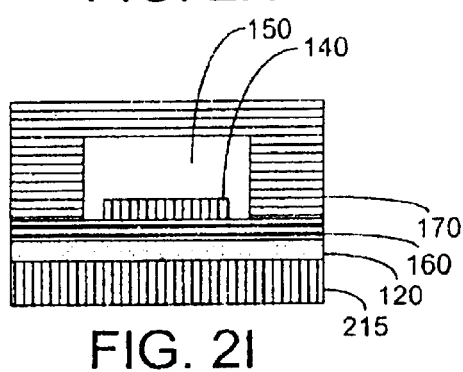
Figure 3I:
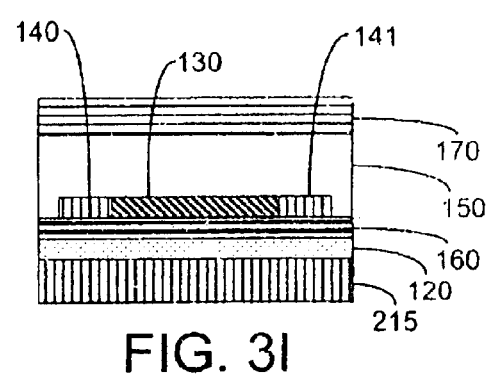
Figure 2J:
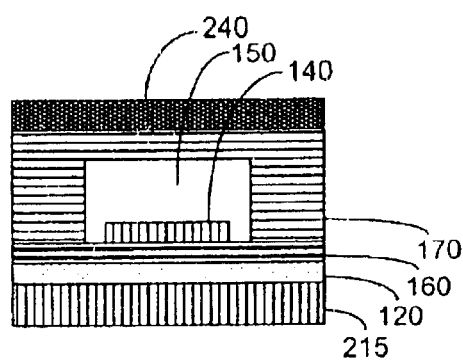
Figure 3J:
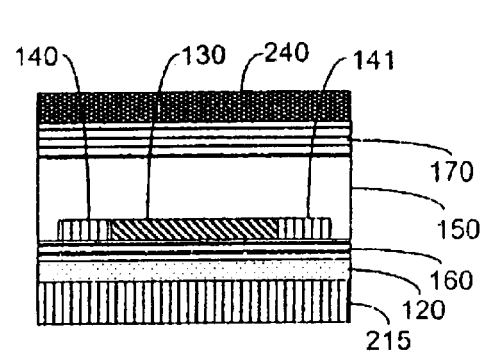
Figure 2K:
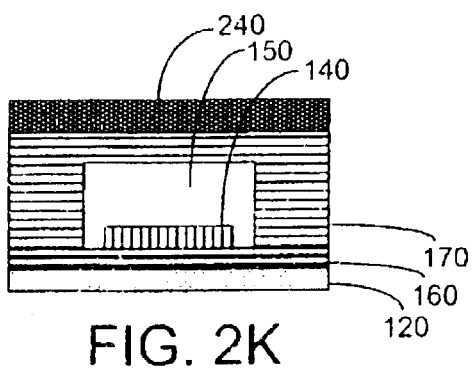
Figure 3K:
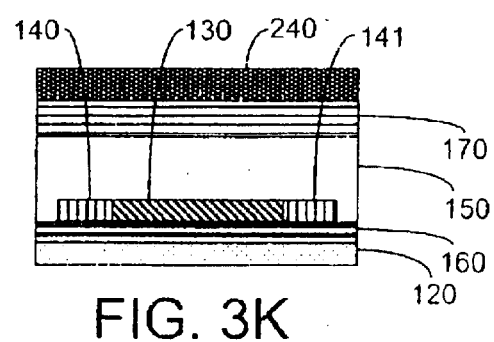
Figure 2L:
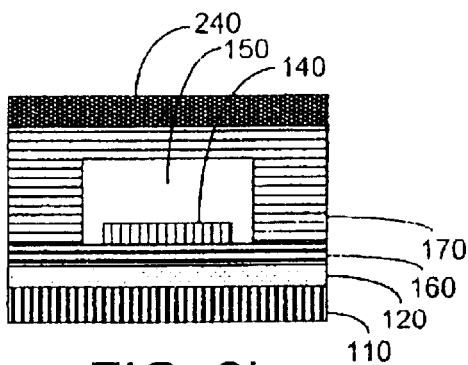
Figure 3L:
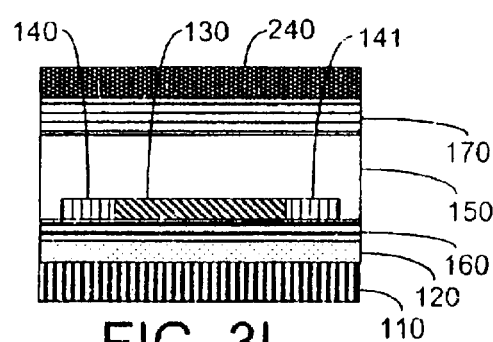
Figure 2M:
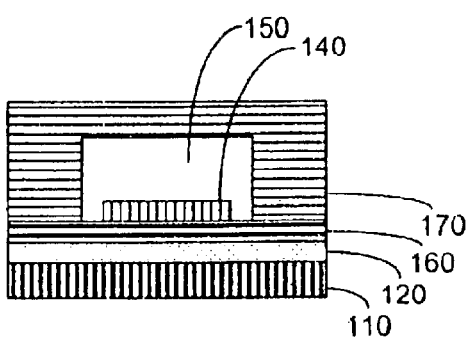
Figure 3M:
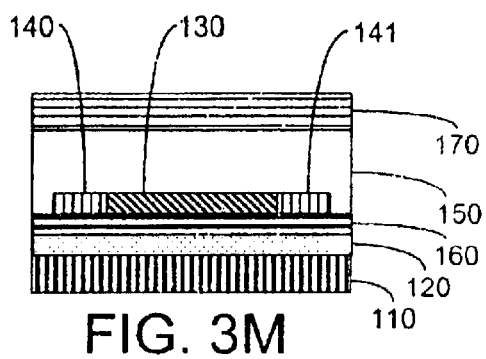

FIGS. 2H and 3H illustrate the second cladding layer 170 disposed on the first cladding layer 160 and the sacrificial layer section 222. FIGS. 2I and 3I illustrate the removal of the sacrificial layer section 222 to form the air-gap cladding layers 150. FIGS. 2J and 3J illustrate the support layer 240 disposed on the second cladding layer 170. The support layer 240 functions as a support for the optical layer while the processing substrate is removed.

FIGS. 2K–2M and 3K–3M illustrate the removal of the processing substrate 215 and the application of the optical layer onto a BP, PWB, or MCM substrate 110, thereby forming device 100.

EXAMPLE 2

FIGS. 4A and 4B are schematics that illustrate two cross-sectional views of device 300 having an optical interconnect layer 302. FIG. 4B is a cross-sectional view of FIG. 4A in substantially the A—A direction, as shown by the arrows in FIG. 4A.

Device 300 includes an optical interconnect layer 302, which includes three waveguides 305A, 305B, and 305C, a first cladding layer 360, a second cladding layer 370 (depicted in some figures as 370A and 370B), and four air-gap cladding layers 350A, 350B, 350C, and 350D. The waveguides include waveguide cores and one or more coupler elements 340A–340C and 341A–341B. Each waveguide core 330A, 330B, and 330C is disposed on the first cladding layer 360. The second cladding layers 370 are disposed on the waveguide cores 330A, 330B, and 330C and the first cladding layer 360. Additional details regarding the spatial relationship of the components of device 300, depicted in FIGS. 4A and 4B, are discussed in FIGS. 5A–5H and 6A–6H, which illustrate an exemplary monolithic fabrication process of device 300. It should be noted that other fabrication processes (e.g., hybrid fabrication process) could be used to fabricate device 300.

The substrate 310, waveguides 305A, 305B, and 305C, waveguide cores 330A, 330B, and 330C, coupler elements 340A–340C and 341A–341C, first cladding layer 360, the second cladding layer 370, and the air-gap cladding layers 350A, 350B, 350C, and 350D, discussed in relation to FIGS. 4A–4B, are analogous or similar to the substrate 110, waveguide 105, waveguide core 130, coupler elements 140 and 141, first cladding layer 160, the second cladding layer 170, and the air-gap cladding layer 150, discussed in reference to FIGS. 1A and 1B, 2A–2M, and 3A–3M above. Therefore, additional discussion of these components will not be presented in relation to device 300. The reader is directed to the discussion presented above for further explanation of these components.

As depicted in FIGS. 4A–4B, the waveguides 305A, 305B, and 305C include air-gap cladding layers 350A, 350B, 350C, and 350D on each side of the waveguide cores 330A, 330B, and 330C and coupler elements 340A–340C and 341A–341B, while the second cladding layer 370 engage the waveguide cores 330A, 330B, and 330C and coupler elements 340A–340C and 341A–341C on the upper portion of the waveguide cores 330A, 330B, and 330C and coupler elements 340A–340C and 341A–341C. Typically, the air-gap cladding layers 350A, 350B, 350C, and 350D extend the length of the waveguide cores 330A, 330B, and 330C. The air-gap cladding layers 350A, 350B, 350C, and 350D have a lower index of refraction (e.g., index of refraction of 1) than the waveguide cores 330A, 330B, and 330C.

Although only three waveguide cores 330A, 330B, and 330C are depicted in FIGS. 4A and 4B, a plurality of waveguide cores can be included in device 300. In addition, multiple levels of waveguide cores can be built atop one another.

For the purposes of illustration only, and without limitation, device 300 of the present invention is described with particular reference to the below-described fabrication method. For clarity, some portions of the fabrication process are not included in FIGS. 5A–5H and 6A–6H. For example, photolithography or similar techniques can be used to define the first and second cladding layers 360, 370A, and 370B, the sacrificial layer, and/or the waveguide cores 330A, 330B, and 330C pattern. In this regard, the pattern can be defined by depositing materials using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication process is not intended to be an exhaustive list that includes all steps required for fabricating device 300. In addition, the fabrication process is flexible because the process steps may be performed in a different order than the order illustrated in FIGS. 5A–5H and 6A–6H.

FIGS. 5A–5H are cross-sectional views of the fabrication process relative to the view illustrated in FIG. 4A, while FIGS. 6A–6H are cross-sectional views of the fabrication process relative to the view in FIG. 4B, section A—A of FIG. 4A. Therefore, FIGS. 5A–5H and 6A–6H illustrate corresponding views in the fabrication process from different cross-sectional views. The varying views of the fabrication process shown in FIGS. 5A–5H and 6A–6H leave been provided to illustrate aspects or the fabrication process that are not necessarily observable using only FIGS. 5A–5H or 6A–6H. In this regard, FIGS. 5A and 6A, 5B and 6B, 5C and 6C, and so on, are discussed in tandem to illustrate various aspects of the representative fabrication process.

Figure 5A:
Figure 6A:
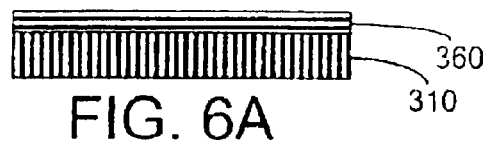
FIGS. 6A–6H are cross-sectional views of the fabrication process relative to the view in FIG. 4B, section A—A of FIG. 4A.
Figure 5B:
Figure 6B:
Figure 5C:
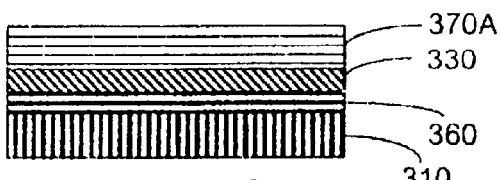
Figure 6C:
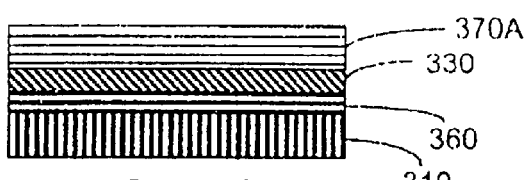
Figure 5D:
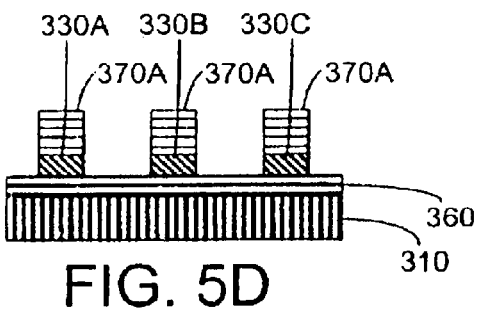
Figure 6D:
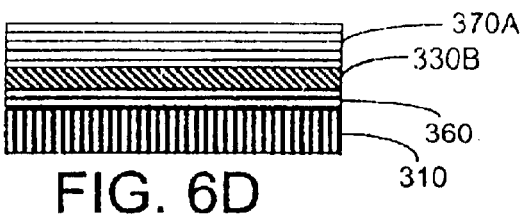

FIGS. 5A and 6A illustrate the first cladding layer 360 disposed on the substrate 310. FIGS. 5B and 6B illustrate the waveguide core 330 disposed on a portion of the first cladding layer 360 before having been etched and photo-defined. FIGS. 5C and 6C illustrate the second cladding layer 370A disposed on the waveguide core 330. FIGS. 5D and 6D illustrate the etching of the waveguide core 330 and the second cladding layer 370A forming three waveguide cores (330A, 330B, and 330C), each with a layer of the second cladding 370A.

Figure 5E:
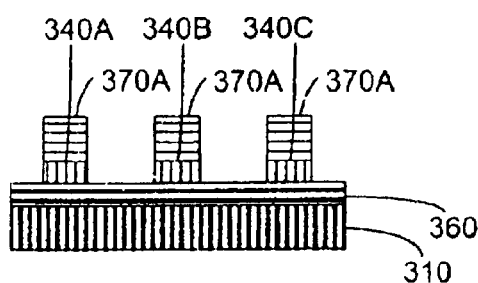
Figure 6E:
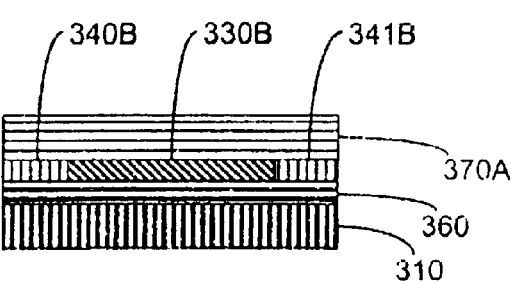

FIGS. 5E and 6E illustrate the defining of a portion of the waveguide cores 330A, 330B, and 330C into coupler elements 340A–340C and 341A–341C. In an alternate embodiment, the waveguide cores 330A, 330B and 330C and coupling material are different materials, in which case a portion of the waveguide core material is removed and coupling material is disposed in those areas. Thereafter, the coupler elements can be defined only within the areas containing the coupling material.

Figure 5F:
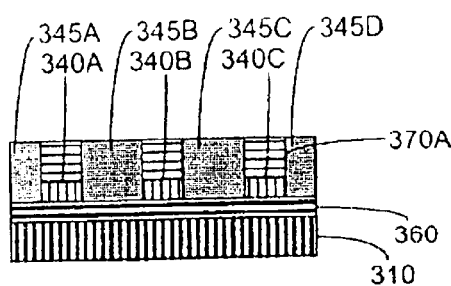
Figure 6F:
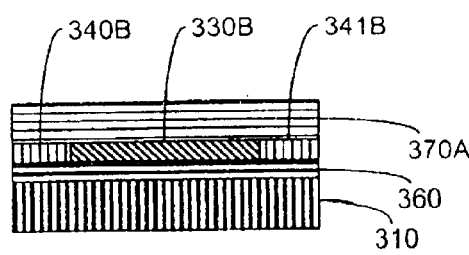

FIGS. 5F and 6F illustrate the sacrificial layers 345A, 345B, 345C, and 345D disposed over the first cladding layer 360, the second cladding layer 370A, the waveguide cores 330A. 330B and 330C, and the coupler elements 340A–340C and 341A–341C. The sacrificial layers 345A, 345B, 345C, and 345D define the areas where the air-gap cladding layers 350A, 350B, 350C, and 350D will subsequently be located once the sacrificial layers 345A, 345B, 345C, 345D and are removed.

Figure 5G:
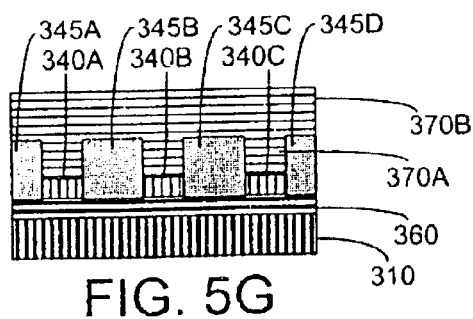
Figure 6G:
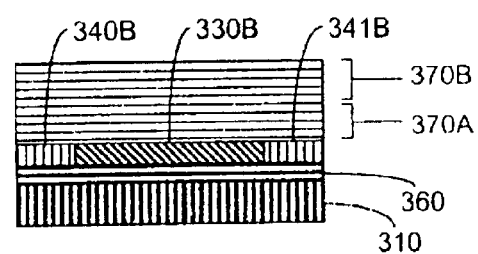
Figure 5H:
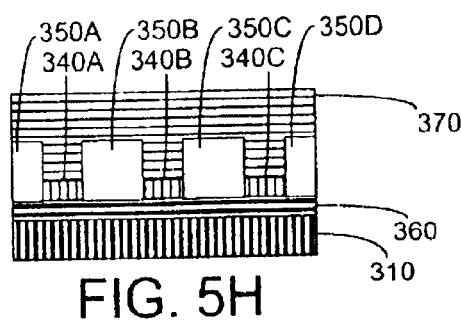
Figure 6H:
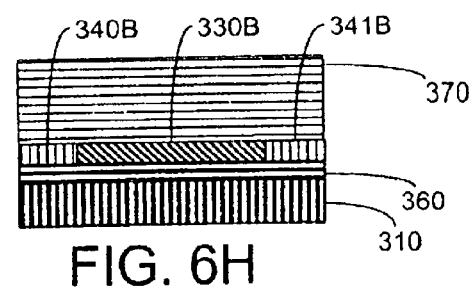

FIGS. 5G and 6G illustrate the remaining portion of the second cladding layer 370B disposed on the second cladding layer 370A and the sacrificial layers 345A, 345B, 345C and 345D. The second cladding layers 370A and 370B form the second cladding layer 370. FIGS. 5H and 6H illustrate the removal of the sacrificial layers 345A, 345B, 345C,and 345D to form the air-gap cladding layers 350A, 350B, 350C, and 350D, thereby forming device 300.

EXAMPLE 3

Figure 7A:
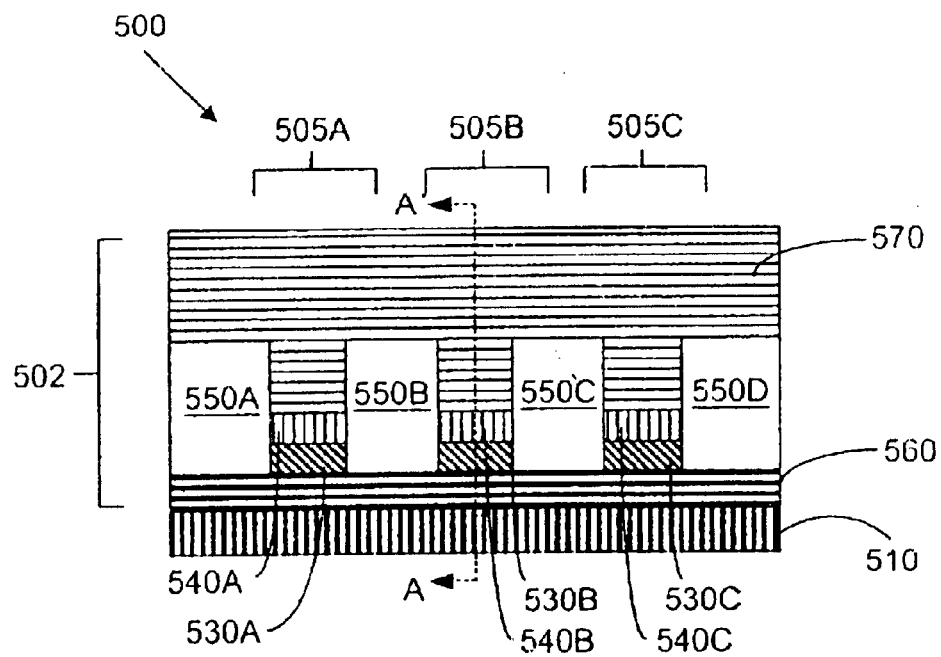
FIGS. 7A–7B are schematics that illustrate two cross-sectional views of still another device.
Figure 7B:
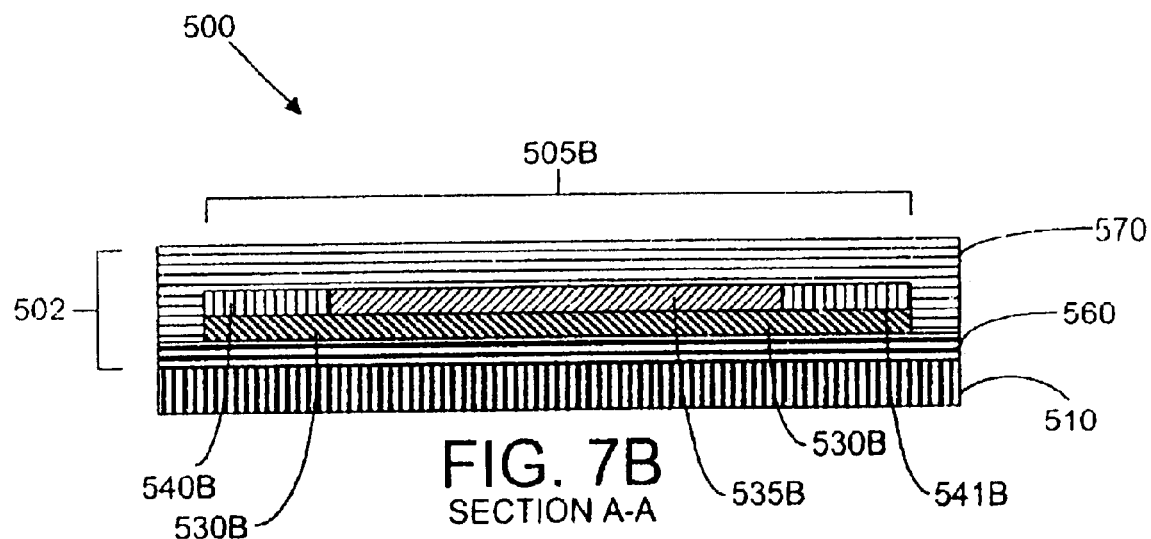

FIGS. 7A and 7B are schematics that illustrate two cross-sectional views of device 500 having surface-mounted coupler elements 540A–540C and 541A–541C. FIG. 7B is cross-sectional view of FIG. 7A in substantially the A—A direction, as shown by the arrows in FIG. 7A.

Device 500 includes an optical interconnect layer 502, which includes, for example, three waveguides 505A, 505B, and 505C, a first cladding layer 560, a second cladding layer 570 (depicted in some figures as 570A and 570B) and four air-gap cladding layers 550A, 550B, 550C, and 550D. The waveguides 505A, 505B, and 505C include waveguide cores 530A, 530B, and 530C and one or more surface-mounted coupler elements 540A–540C and 541A–541C. The waveguide cores 530A, 530B, and 530C are disposed on the first cladding layer 560, while the surface-mounted coupler elements 540A–540C and 541A–541C are located on the waveguide cores 530A, 530B and 530C, respectively. The second cladding layer 570 is disposed on the surface-mounted coupler elements 540A–540C and 541C–541C and the coupling layer 535A, 535B, and 535C. Additional details regarding the spatial relationship of the components of device 500, depicted in FIGS. 7A and 7B, are discussed in FIGS. 8A–8I and 9A–9I, which illustrate an exemplary monolithic fabrication process of device 500. It should be noted that other fabrication processes (e.g., hybrid fabrication process) could be used to fabricate device 500.

The substrate 510, waveguides 505A, 505B, and 505C, waveguide cores 530A, 530B, and 530C, first cladding layer 560, the second cladding layer 570, and the air-gap cladding layers 550A, 550B, 550C, and 550D, discussed in relation to FIGS. 7A–7B, are analogous or similar to the substrate 310, waveguides 305A, 305B, and 305C, waveguide cores 330A, 330B, and 330C, first cladding layer 360, the second cladding layer 370, and the air-gap cladding layers 350A, 350B, 350C, and 350D, discussed in reference to FIGS. 4A and 4B, 5A–5H, and 6A–6H above. Therefore, additional discussion of these components will not be presented in relation to device 500. The reader is directed to the discussion presented above for further explanation of these components.

As depicted in FIGS. 7A–7B, the waveguides 505A, 505B, and 505C include air-gap cladding layers 550A, 550B, 550C and 550D on each side of the waveguide cores 530A, 530B, and 530C and surface-mounted coupler elements 540A–540C and 541A–541C, while the second cladding layer 570 engages the surface-mounted coupler elements 540A–540C and 541A–541C, on the upper portion of the surface-mounted coupler elements 540A–540C and 541A–541C. Typically, the air-gap cladding layers 550A, 550B, 550C, and 550D extend the length of the waveguide cores and surface-mounted coupler elements 540A–540C and 541A–541C. The air-gap cladding layers 550A, 550B, 550C, and 550D have a lower index of refraction (e.g., index of refraction of 1) than the waveguide cores 540A, 540B, and 540C.

As indicated above, waveguides 505A, 505B, and 505C include waveguide cores 530A, 530B, and 530C, coupling layers 535A, 535B, and 535C, and surface-mounted coupler elements 540A–540C and 541A–541C. In this embodiment the surface-mounted coupler elements 540A–540C and 541A–541C are located above the waveguide cores 530A, 530B, and 530C in a surface-mount fashion. The surface-mounted couplers 540A–540C and 541A–541C can be fabricated in the same or similar manner as the couplers 340A–340C and 341A–341C discussed in relation to FIGS. 4A and 4B. In general, surface-mounted couplers operate based on evanescent interaction between the coupling layer and waveguide core.

For the purposes of illustration only, and without limitation, device 500 of the present invention is described with particular reference to the below-described fabrication method. For clarity, some portions of the fabrication process are not included in FIGS. 8A–8I and 9A–9I. For example, photolithography or similar techniques can be used to define the first and second cladding layers 560 and 570, the sacrificial layer, and/or waveguide core 530A, 530B, and 530C. In this regard, the pattern can be defined by using techniques such as, for example, sputtering, chemical vapor deposition (CVD), plasma based deposition systems, evaporation, electron-beam systems. Furthermore, the pattern can then be removed using reactive ion etching techniques (RIE), for example.

The following fabrication processes are not intended to be an exhaustive list that includes every step required for fabricating device 500. In addition, the fabrication process is flexible, because the process steps can be performed in a different order than the order illustrated in FIGS. 8A–8I and 9A–9I.

FIGS. 8A–8I are cross-sectional views of the fabrication process relative to the view illustrated in FIG. 7A, while FIGS. 9A–9I are cross-sectional views of the fabrication process relative to the view in FIG. 7B, section A—A of FIG. 7A. Therefore, FIGS. 8A–8I and 9A–9I illustrate corresponding views in the fabrication process from different cross-sectional views. The varying views of the fabrication process shown in FIGS. 8A–8I and 9A–9I have been provided to illustrate aspects of the fabrication process that are not necessarily observable using only FIGS. 8A–8I and 9A–9I. In this regard, FIGS. 8A and 9A, 8B and 9B, 8C and 9C, and so on, are discussed in tandem to illustrate various aspects of the fabrication process.

Figure 8A:
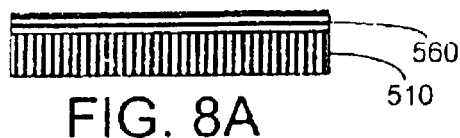
Figure 9A:
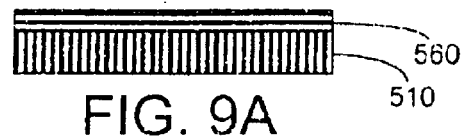
FIGS. 9A–9I are cross-sectional views of the fabrication process relative to the view in FIG. 7B, section A—A of FIG. 7A.
Figure 8B:
Figure 9B:
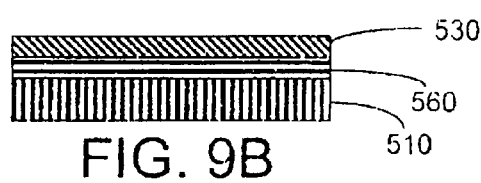

FIGS. 8A and 9A illustrate the first cladding layer 560 disposed on the substrate 510. FIGS. 8B and 9B illustrate the waveguide core 530 disposed on a portion of the first cladding layer 560 before having been etched and photo-defined.

Figure 8C:
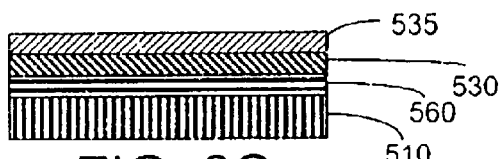
Figure 9C:
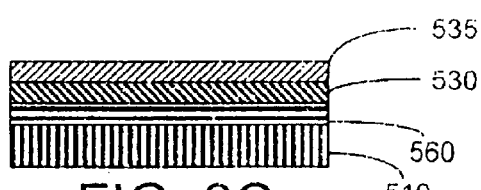
Figure 8D:
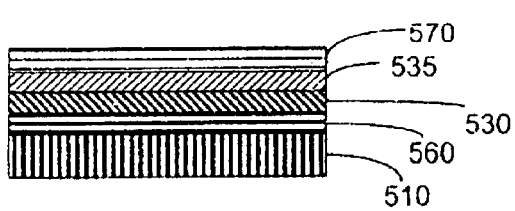
Figure 9D:
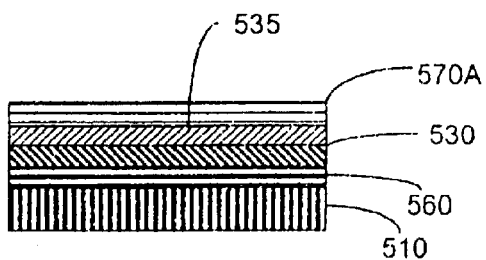

FIGS. 8C and 9C illustrate the coupler material 535 deposited on the waveguide core 530. FIGS. 8D and 9D illustrate the second cladding layer 570A deposited on the coupler material 535.

Figure 8E:
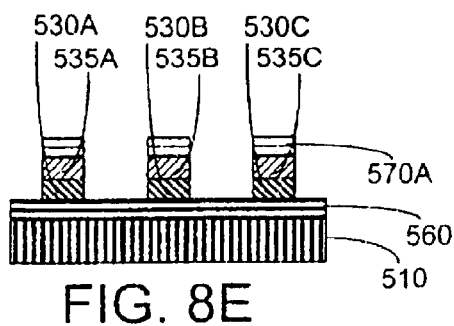
Figure 9E:
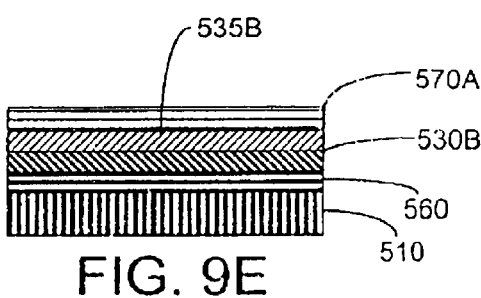
Figure 8F:
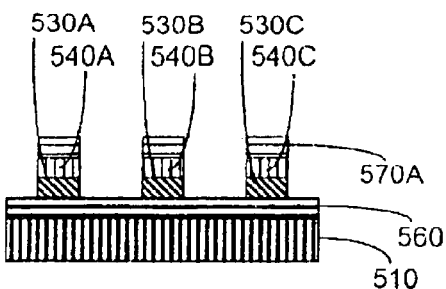
Figure 9F:
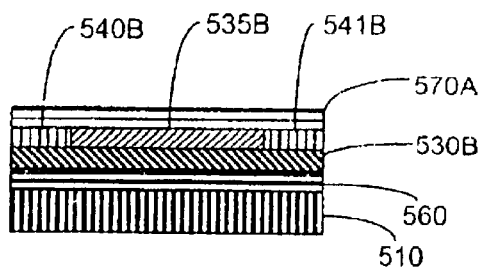

FIGS. 8E and 9E illustrate the etching of the waveguide core 530, the volume coupler material 535, and the second cladding layer 570A to form three waveguides 505A, 505B, and 505C. FIGS. 8B and 9F illustrate the definition of a portion of the coupler material to form coupler elements 540A–540C and 541A–541C.

Figure 8G:
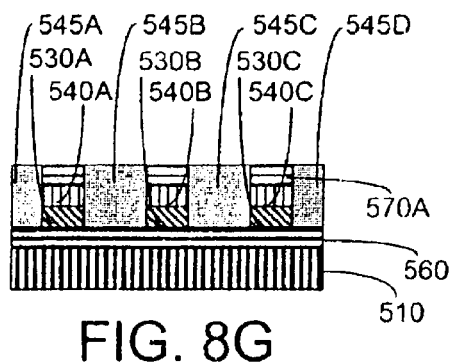
Figure 9G:
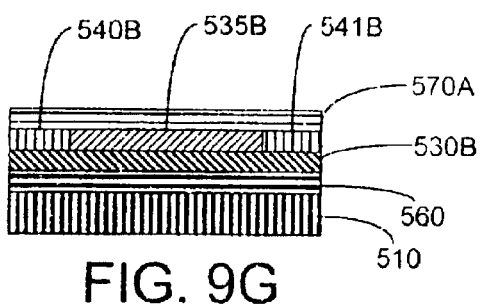

FIGS. 8G and 9G illustrate the sacrificial layers disposed over the first cladding layer 560, the second cladding layer 570A, the waveguide cores 530A, 530B, and 530C, and the coupler elements 540A–540C and 541A–541C. The sacrificial layers 545A, 545B, and 545C define the areas where the air-gap cladding layers 550A, 550B, and 550C will subsequently be located once the sacrificial layers 545A, 545B, and 545C are removed.

Figure 8H:
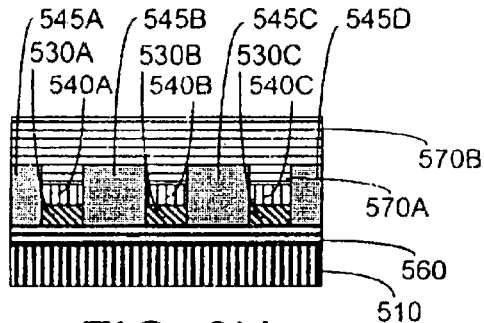
Figure 9H:
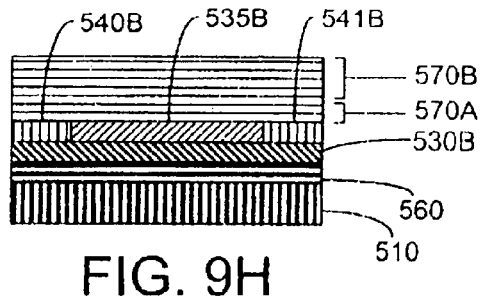
Figure 8I:
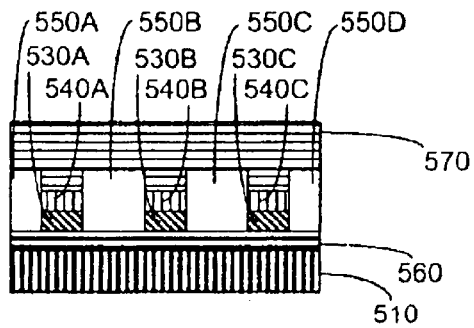
Figure 9I:
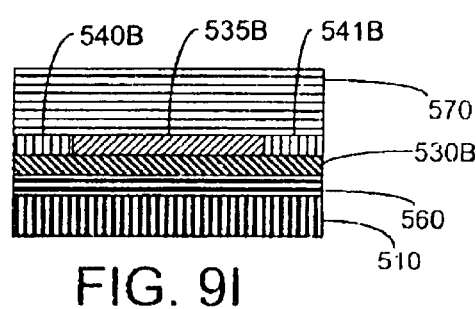

FIGS. 8H and 9H illustrate the remaining portion of the second cladding layer 570B disposed on the second cladding layer 570A and the sacrificial layers 545A, 545B, and 545C. FIGS. 8I and 9I illustrate the removal of the sacrificial layers 545A, 545B, and 545C to form the air-gap cladding layers 550A, 550B, 550C, and 550D, thereby forming device 500.

It should be emphasized that the above-described embodiments of the present invention are merely possible examples of implementations, and are set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A device, comprising:

an optical interconnect layer including:

a first cladding layer;

a second cladding layer;

at least one waveguide having a waveguide core; and an air-gap cladding layer engaging a portion of waveguide core, wherein the first cladding layer and the second cladding layer engage the waveguide.

2. The device of claim 1, further comprising:

a first sacrificial layer that can be removed to form the air-gap cladding layer.

3. The device of claim 2, wherein the first sacrificial layer is chosen from polynorborenes, polyoxymethylene, polycarbonates, polyethers, and polyesters.

4. The device of claim 1, wherein the device is chosen from a backplane, a printed wiring board, and a multi-chip module.

5. The device of claim 1, further comprising, at least one coupler element disposed adjacent to the waveguide core.

6. An optical interconnect layer, comprising:

a first cladding layer;

a second cladding layer;

at least one optical dielectric waveguide having a waveguide core; and an air-gap cladding layer engaging a portion of waveguide core, wherein the first cladding layer and the second cladding layer engage the waveguide.

7. The optical interconnect layer of claim 6, further comprising a substrate made of a dielectric material.

8. The optical interconnect layer of claim 6, wherein the first cladding layer is chosen from polyimides, polynorborenes, epoxides, polyarylenes, ethers, and parylenes.

9. The optical interconnect layer of claim 6, wherein the second cladding layer is chosen from polyimides, polynorborenes, epoxides, polyarylenes, ethers, and parylenes.

10. The optical interconnect layer of claim 6, wherein the air-gap cladding layer has a height from about 1 to about 100 micrometers.

11. A method for monolithically fabricating an optical interconnect layer comprising:

(a) disposing at least one waveguide core on a portion of a first cladding layer;

(b) disposing a sacrificial layer onto at least one portion of the first cladding layer and a portion of the waveguide core;

(c) disposing a second cladding layer onto the first cladding layer and the sacrificial layer; and (d) removing the sacrificial layer to define an air-gap cladding layer within the first cladding layer and the second cladding layer, and wherein the air-gap cladding engages a portion of the waveguide core.

12. The method of claim 11, further including:

forming a volume grating layer adjacent to the waveguide core after (a) and before (b).

13. The method of claim 12, further including:

forming at least one volume grating coupler element.

14. The method of claim 11, further including:

integrating the optical interconnect layer into a device chosen from a backplane, a printed wiring board, and a multi-chip module.

15. A method for fabricating a device having an optical interconnect layer comprising:

disposing at least one waveguide core on a portion of a first cladding layer;

forming at least one volume grating coupler element adjacent the waveguide core;

disposing a sacrificial layer onto at least one portion of the first cladding layer and a portion of the waveguide core;

disposing a second cladding layer onto the first cladding layer and the sacrificial layer;

removing the sacrificial layer to define an air-gap cladding layer within the first cladding layer and the second cladding layer, and wherein the air-gap cladding engages a portion of the waveguide core; and attaching the optical interconnect layer to a device chosen from a backplane, printed wiring board, and a multi-chip module.

16. The method of claim 15, wherein the sacrificial layer is chosen from polynorborenes, polyoxymethylene, polycarbonates, polyethers, and polyesters.

17. The method of claim 15, wherein the waveguide core includes a transparent dielectric material.

18. The method of claim 15, wherein the first cladding layer is chosen from polyimides, polynorborenes, epoxides, polyarylenes, ethers, and parylenes.

19. The method of claim 15, wherein the second cladding layer is chosen from polyimides, polynorborenes, epoxides, polyarylenes, ethers, and parylenes.

* * * * *